Dec. 9, 1924.                                                    1,518,409
F. W. LOVEJOY
PHOTOGRAPHIC FILM
Filed May 5, 1922          3 Sheets-Sheet 1
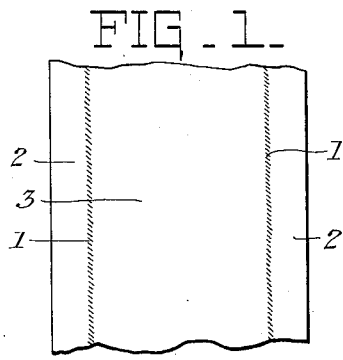
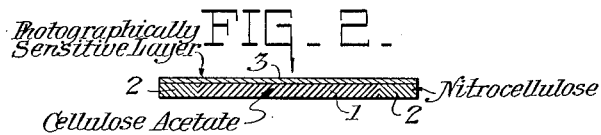
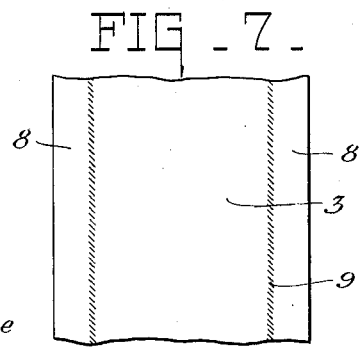
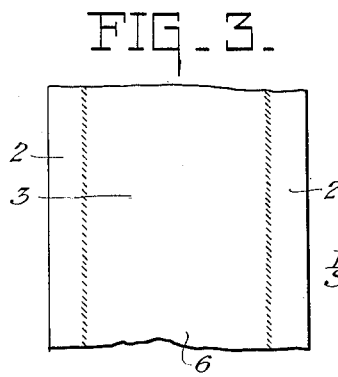
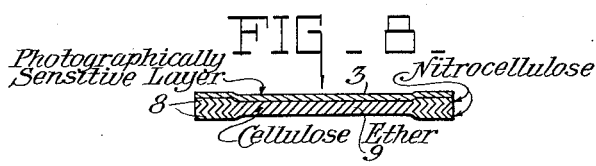
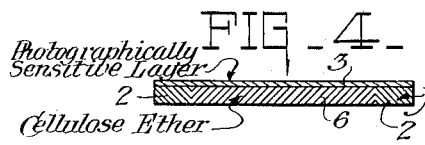
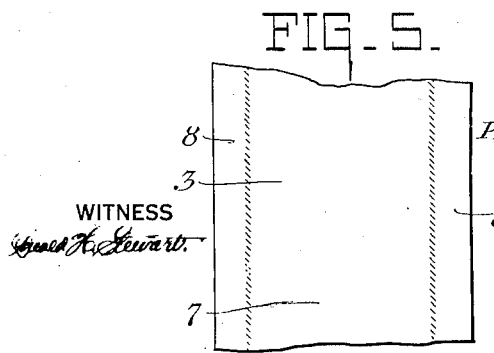
WITNESS
INVENTOR
Frank W. Lovejoy,
BY R. L. Stinchfield
ATTORNEY Dec. 9, 1924.                                                                1,518,409
F. W. LOVEJOY
PHOTOGRAPHIC FILM
Filed May 5, 1922                          3 Sheets-Sheet 2
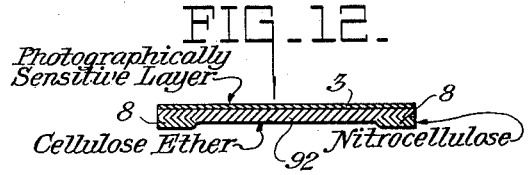
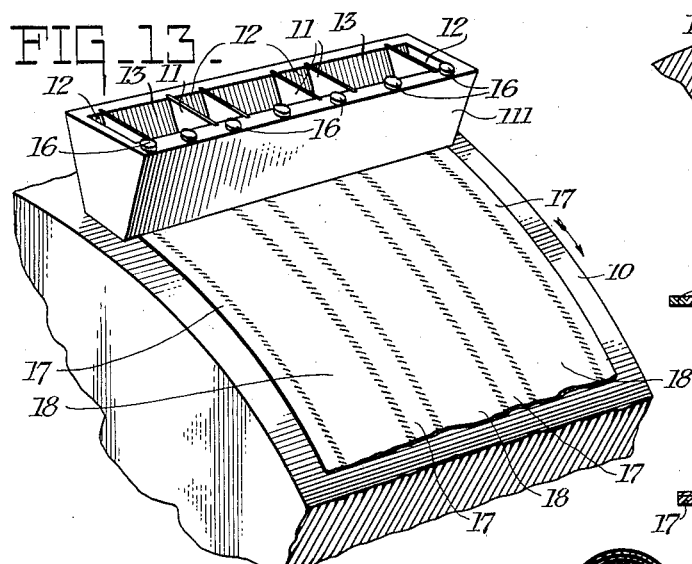
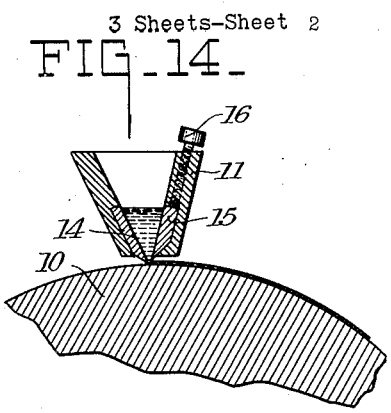
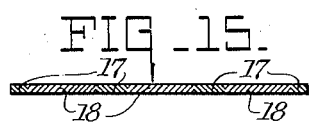
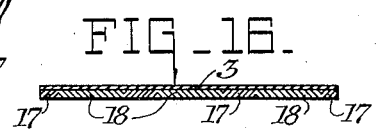
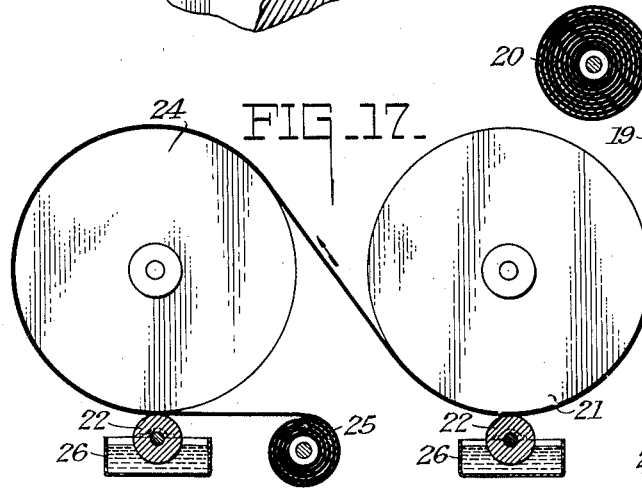
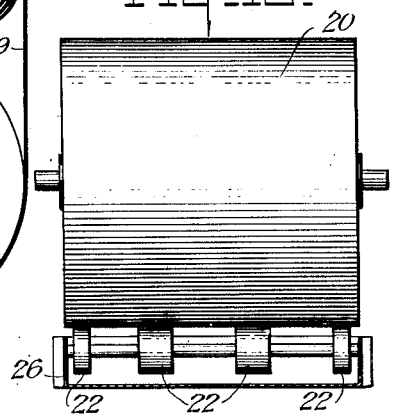
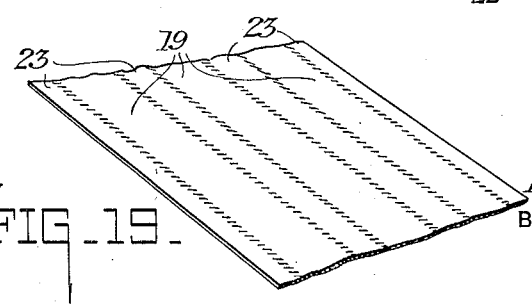
WITNESS
INVENTOR
Frank W. Lovejoy,
BY
ATTORNEY Dec. 9, 1924.
F. W. LOVEJOY
PHOTOGRAPHIC FILM
Filed May 5, 1922  3 Sheets-Sheet 3
1,518,409
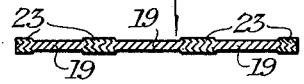
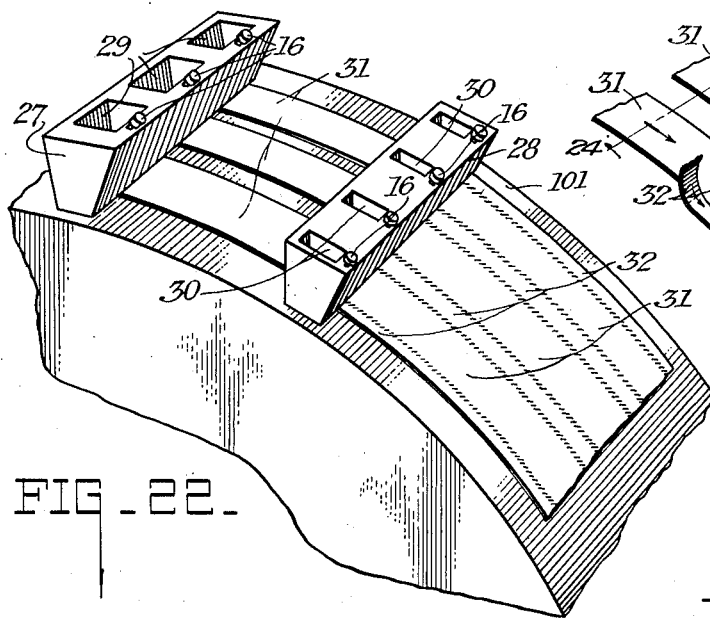
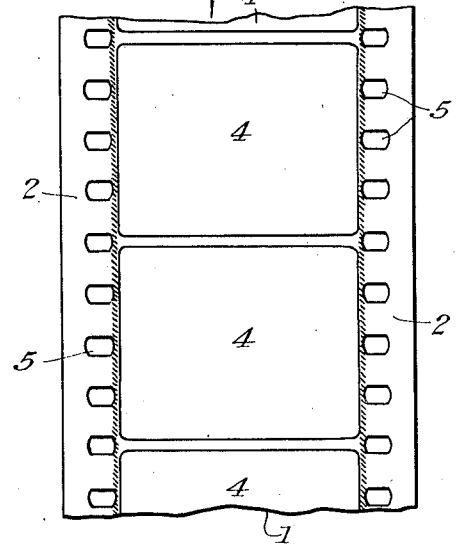
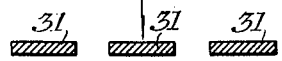
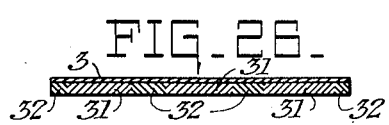
WITNESS
INVENTOR
Frank W. Lovejoy,
BY
ATTORNEY Patented Dec. 9, 1924.

1,518,409

UNITED STATES PATENT OFFICE.

FRANK W. LOVEJOY, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC FILM.

Application filed May 5, 1922. Serial No. 558,747.

*To all whom it may concern:*

Be it known that I, FRANK W. LOVEJOY, a citizen of the United States of America, residing at Rochester, in the county of Monroe and State of New York, have invented certain new and useful Improvements in Photographic Films, of which the following is a full, clear, and exact specification.

This invention relates to photographic film, and finds its widest application in the motion picture art. One object of my invention is to provide a film of this kind which has high resistance to heat action. Another object is to provide such a film which has high resistance to mechanical action. A still further object is to provide a film which has a low fire risk yet will be suitably tough in its mechanical transmitting portions. Other objects will hereinafter appear.

In the drawings,—

Figs. 1, 3, 5 and 7 are fragmentary plan views of films embodying my invention;

Figs. 2, 4, 6, 8, 9, 10, 11 and 12 are sectional views illustrating different embodiments of my invention, Figs. 2, 4, 6 and 8 respectively showing cross sections of the films in Figs. 1, 3, 5, and 7;

Fig. 13 is a diagrammatic fragmentary perspective view showing one method and apparatus by which my film may be prepared;

Fig. 14 is a fragmentary sectional view of the apparatus shown in Fig. 13;

Fig. 15 is a cross section of a multiple film base prepared by the apparatus illustrated in Figs. 13 and 14;

Fig. 16 is a cross section of the multiple film base of Fig. 15 bearing a sensitive photographic layer;

Fig. 17 is a diagrammatic side elevation, parts being shown in section, of an apparatus in which certain embodiments of my invention may be prepared;

Fig. 18 is an end elevation of the same apparatus;

Fig. 19 is a fragmentary perspective view of a multiple film base produced by the apparatus shown in Figs. 17 and 18;

Fig. 20 is a cross section of a multiple film base prepared by the apparatus shown in Figs. 17 and 18;

Fig. 21 is a cross section showing the multiple film base of Fig. 20 bearing a photographically sensitive layer;

Fig. 22 is a fragmentary diagrammatic perspective view illustrating a further apparatus and method of preparing film embodying my invention;

Fig. 23 is a fragmentary diagrammatic perspective view showing the method of uniting the elements of my film;

Fig. 24 is a section taken on the line 24—24 of Fig. 23;

Fig. 25 is a section taken on the line 25—25 of Fig. 23;

Fig. 26 is a section of a multiple film base coated with a photographically sensitive layer;

Fig. 27 is a fragmentary plan view of a motion picture film embodying my invention and having finished pictures thereon as well as perforations in the margins.

In all the figures of the drawings the parts have been exaggerated, as regards size and relative proportions, in order to facilitate a clear exposition of the invention.

Broadly speaking, I provide a film in which the base contains relatively tougher sections which constitute the mechanical transmitting portions of the film. In another aspect of my invention I provide a film in which the portion subject to the greater heat action is of relatively high resistance to such action, while the portion outside of the region of greater heat action is selected without regard to its resistance to heat action, but with respect to its other desired properties. In this way the film may be made resistant to heat, where such resistance is most essential, while it may be made resistant to mechanical action,— that is, resistant to tearing, fracture from brittleness, etc., as well as resistant to abrasion and scratching, by using tougher material in the parts subjected to the greater mechanical action. These results may be brought about by making the portion of the base within the picture area, which will be subject to heat during projection, of a cellulosic material based upon a derivative compound of cellulose, and making the mechanical transmitting portions outside of the picture area out of celluiosic material based upon a different derivative compound of cellulose.

In Figs. 1 and 2, I have illustrated the preferred embodiment of my invention. This comprises a film having a central strip 1 composed of a cellulose acetate composition united at its edges to nitrocellulose marginal strips 2 of substantially the same thickness as the central strip 1, the two respective strips being interunited,—that is, the union is effected by an intermingling of the strips at their contacting edges in a way probably analogous to a welded or soldered joint in metals. Upon the film base composed of strips 1 and 2 is located any usual or preferred photographically sensitive layer 3. At the present time the most useful layer of this kind is a gelatino-silver-halid emulsion of the so-called positive type. My invention, however, is not restricted to this particular choice of sensitive layer.

It will be noted that the area of the strip 1 corresponds generally to the area to be occupied by the pictures produced in layer 3. This latter area may conveniently be termed the "picture area," whether the layer 3 is in the sensitive state or whether pictures have been produced therefrom. Thus in Fig. 27 the pictures 4, indicated schematically by rectangles, have been prepared from the sensitized layer 3 and perforations 5 have been made in the marginal strips 2 for engagement with any suitable driving mechanism of motion picture apparatus. While I prefer to have the cellulose acetate strips comprise rather more than the picture areas, they may comprise somewhat less of said areas without departing from the spirit of my invention. I prefer to have them at least as large as said areas, in order that the rays of a projection lantern may fall only on them, and in order that any irregularities occurring along the lines of union between strips 1 and 2 may not affect the projected pictures.

The cellulose acetate compositions employed for the strip 1 and the nitrocellulose compositions employed for the strips 2 may be of the usual types. I prefer to employ the acetone-soluble cellulose acetate because, as will be explained later, an interunion with the marginal strips is more easily effected. While certain modifying materials, such as camphor and camphor substitutes, such as triphenyl phosphate, fusel oil, butyl alcohol, monochlornaphthalene, and the like are preferably employed in the proportions usual in film in the cellulosic materials constituting the strips 1 and 2, nevertheless those strips are substantially composed of the described addition compounds of cellulose, namely cellulose acetate and nitrocellulose. Cellulose acetate is typical of the fatty acid esters of cellulose. As is well known, such esters are less inflammable than nitrocellulose, while nitrocellulose material is in general tougher and more resistant to mechanical action than acetate material, particularly when the latter is best adapted to resist heat.

In Figs. 3 and 4 I have shown a modification in which the central strip 6 instead of being composed of a cellulose acetate composition is based upon a different addition compound of cellulose,—namely, cellulose ether, of which water-insoluble ethyl cellulose is typical. The marginal strips 2 of nitrocellulose material are interunited at their edges to the central strip 6, and the base is coated with the photographically sensitive layer 3.

Figs. 5 and 6 illustrate a useful but less desirable modification. The base throughout its entire width has a layer 7 of cellulose acetate. Within the picture area the entire thickness of the film is of such acetate composition. But in the margins there are relatively thin reinforcing strips 8 of nitrocellulose material near the surfaces of the base. These strips rise above the planes defining the surface of the central portion of layer 7, but also penetrate slightly below such planes into the body of the base, this being exaggerated to make it clear in Fig. 6. Ordinarily I prefer to make these strips from .001 inch to .002 inch in thickness. The base in this species carries the usual photographically sensitive layer 3. If this layer should be thinner above the strips 8, no harm results so long as it is coated with the requisite evenness above the picture area, the strips 8 being substantially outside of such area.

Figs. 7 and 8 illustrate a modification similar in general structure to that shown in Figs. 5 and 6, the strips 8 of relatively tougher nitrocellulose material being located in a layer 9 of cellulose ether instead of cellulose acetate. The photographically sensitive layer 3 is provided as usual.

Fig. 9 illustrates a modification which is very similar to the species shown in Figs. 5 and 6, except that only one set of nitrocellulose strips 8 have been provided to reinforce the margin instead of two such strips, as in Fig. 6. The cellulose acetate layer 71, therefore, extends to the margins at the lower or non-sensitized face, while the strips 8 are adjacent the sensitive photographic layer 3.

Fig. 10 shows substantially the same form as Fig. 9, except that the strips 8 are located in a cellulose ether layer 91 instead of a cellulose acetate layer. The usual photographically sensitive coating 3 is provided.

Fig. 11 illustrates a further embodiment in which the cellulose acetate layer 72 carries the reinforcing nitrocellulose strips 8 in the lower or non-sensitized face, the sensitive coating 3 being located upon an uninterrupted cellulose acetate surface.

Fig. 12 shows a further modification which is substantially like that in Fig. 11, except that cellulose ether 92 replaces cellulose acetate, the nitrocellulose strips 8 being on the surface opposite to the sensitive layer 3.

One way of preparing my films is illustrated in Figs. 13 to 16 inclusive. Above a moving surface, such as that of a large smooth wheel 10 of the well known film-making type, is located a trough 111 divided by vertical partitions 11 into a series of separate compartments 12 which alternate with adjacent compartments 13. At the bottom of each compartment is a slot at right angles to the direction of movement of wheel 10, said slit being formed between blades 14, and adjustable edge 15, the latter being controlled by adjusting screws 16.

The compartments 12 may be charged with one composition and the compartments 13 with a different composition. The compositions are then allowed to flow out upon the moving wheel surface, thereby forming film strips which coalesce and interunite at their edges. Thus the compartments 12 may contain a nitrocellolose dope having considerable acetone as one of its volatile solvents, and compartments 13 may contain a cellulose acetate composition which also contains acetone. The ingredients are so proportioned and the edges 15 so adjusted that film strips of approximately the same thickness are formed on the moving surface. The dopes are also of such consistency that there will be just sufficient spreading to weld the edges of the strips together under the influence of a common solvent, like acetone.

This results in a base, indicated diagrammatically in section in Fig. 15, composed of nitrocellulose strips 17 and cellulose acetate strips 18. The strips 18 are substantially as wide as, or slightly wider than, the desired picture areas of the ultimate films. The strips 17 are, except for the two end strips, of double the width required in the marginal portions of the finished films. Of course, the outermost strips 17 will be relatively wider than is shown in Fig. 15, in order to provide an irregular so-called "safe edge" which will be finally cut off as waste. This is omitted from the drawing for the sake of clearness. The useful portions of outermost strips 17 will, therefore, be of the width necessary for single marginal portions of the film, as shown in Fig. 15. On the base thus prepared, which has a sufficiently even upper surface for that purpose, there is spread the photographically sensitive layer 3. Finally the film is longitudinally slitted along the median lines of strips 17, except the outermost strips, thereby producing films of the character shown in Figs. 1 to 4 inclusive. Of course, the cellulose acetate in the above example can be replaced by any other of the previously indicated ingredients, such as cellulose ether, appropriate common solvents being employed in the flowable compositions.

Figs. 17 to 21 inclusive indicate diagrammatically a method of preparing the species shown in Figs. 5 to 8 inclusive. A web 19 of a relatively non-inflammable cellulosic material such as a cellulose acetate composition, passes from supply roll 20 over guide roll 21, beneath which it contacts with separate applying rollers 22, which bear against its under surface and apply thereto separated strips or bands 23 of relatively tougher material, such as a nitrocellulose composition. These rolls are of sufficient width and spaced sufficiently apart to apply the nitrocellulose strips in proper width and at proper distances apart to permit the final product to be slit up into films having cellulose acetate picture areas and nitrocellulose marginal portions. The web 19 passes over a second guide roll 24 in the reverse direction, beneath which is located another set of spaced rolls 22 which apply strips 23 of the nitrocellulose composition to the opposite face of the web 19 in approximate registry with the first strips 23. The final multiple film base is wound on take-up reel 25. The rolls 22 dip into tanks 26, diagrammatically indicated in section, which contain the nitrocellulose dope.

On the multiple base thus prepared there is spread the usual photographically sensitive layer 3. The multiple film is then cut up into longitudinal strips by severing along the middle of strips 23, so as to form films of the general section shown in Figs. 5 to 8 inclusive. Of course, other cellulosic material of low inflammability, such as cellulose ether, may be used in place of the cellulose acetate referred to hereinabove by way of illustration. By lowering the second set of rolls 22, so that they do not contact with web 19 in Fig. 17, reinforcing strips 23 may be applied to one surface only, thereby enabling the production of the species shown in Figs. 9 to 12 inclusive after suitable coating, cutting and slitting operations, as will be obvious.

Figs. 22 to 26 illustrate another way of preparing the embodiments of my invention shown in Figs. 1 to 4 inclusive. Referring to Fig. 22 the surface of the film wheel 101 of usual construction passes in succession beneath troughs 27 and 28, the former having a series of separated compartments 29 and the latter a series of separated compartments 30. All of these compartments are provided with film-forming slits, blades, adjustable edges and adjusting screws, as previously explained in connection with Fig. 14. The compartments 29 of the trough 27 are staggered or alternate with the compartments 30 of trough 28. In other words, strips 31 deposited from the compartments 29 upon the surface of wheel 101 will be carried by the latter beneath the trough 28, but between compartments 30, so that the strips 32 formed from compartments 30 will pass into the spaces between the strips 31 and fill such spaces. Because of the action of a common solvent the two sets of strips 31, 32 will unite together, as schematically indicated in Fig. 23, to form a multiple film base, a section of this being shown in Fig. 25, (without the safe edge which ultimately is cut off as waste). The viscosities of the cellulosic dopes in compartments 29 and 30 are maintained at the best relative values to effect proper production and interunion of the strips, the rate of travel of wheel 10 being also taken into consideration. This result may be attained by varying the amount of volatile solvents in the dopes, by regulating the temperatures of the troughs and wheel, or by other common expedients, which are understood by those skilled in the film-making art. Sufficient common solvent should, of course, be used in the dopes in compartments 30 to enable the interunion of the strips to take place quickly on the face of wheel 10.

The compartments 29 are proportioned to form strips 31 of cellulose acetate or cellulose ether, or the like, of sufficient width to constitute the picture areas or projection portions of the finished film strip. The compartments 30 are proportioned to provide strips 32 out of which marginal portions of the ultimate film may be formed. Preferably the compartments 30 are approximately as wide as or slightly wider than the spaces between the compartments 29, particularly if the dopes employed require a slight overlapping of the strips while in a plastic condition, to insure better union between them.

As indicated in Fig. 26, the multiple film base may be coated with the usual photographically sensitive layer 3. The combination is then slit along the middle lines of strips 32, except the outer ones, thereby producing films of the type disclosed in Figs. 1 to 4.

It will be noted that in each of the species of my invention which has been described, by way of illustration, there is a portion of relatively low inflammability,—that is, a portion that is much less inflammable than the usual film having a nitrocellulose base. It will also be noted that in all of such illustrative embodiments there are portions constituting mechanical transmitting means which are relatively tougher and more resistant to the mechanical action, being composed of a more durable material, such as nitrocellulose. Moreover these reinforcing portions or strips all include or are based upon a cellulosic addition compound which is different from the cellulosic addition compound embodied in the other portions of the film. Furthermore, the composition or material in such reinforcing strips is in a colloidal condition and the other portions of the film are preferably in that state also, giving transparent flexible films in the preferred embodiments. Clear transparent picture areas are thus available, if required.

It follows that films embodying my invention, insure increased safety when used for projection or when stored and yet are mechanically durable. Only a very small part of their bulk is of material involving bothersome fire risk, and such material is arranged where it is least likely to cause trouble. Moreover, when ignited such material burns only in small portions along the edge, the total mass of material which can burn rapidly being only a relatively small fraction of the total film.

Having thus described my invention, what I claim as new and desire to secure by Letters Patent is:

1. A motion picture film having a base of a cellulosic material, said base containing relatively tougher sections which constitute the mechanical transmitting portion of the film, said sections comprising a different cellulosic material in a colloidal state.

2. A motion picture film having a base comprising within the picture area a portion of cellulosic material and comprising outside of said picture area mechanical transmitting means, which includes a section of relatively tougher cellulosic material in a colloidal state.

3. A motion picture film, the base of which has a central strip of cellulosic material and has two marginal strips interunited to said central strip at the edges thereof, said marginal strips comprising reinforcements of relatively tougher cellulosic material in a colloidal state.

4. A photographic film for projection, the base of which contains in the portion thereof that is subject to greater heat action a cellulosic material of relatively greater resistance to heat action and contains in the portion thereof that is subject to less heat action, a cellulosic material of relatively less resistance to heat action.

5. A motion picture film, the base of which contains in the portion subject to greater heat action but less mechanical action a cellulosic material of relatively low inflammability but weaker resistance to mechanical action, and contains in the portion thereof that is subject to lesser heat action and greater mechanical action a cellulosic material of relatively greater inflammability and greater resistance to mechanical action.

6. A motion picture film having a base of cellulosic material of relatively low inflammability within the picture area and mechanical transmitting means of cellulosic material of relatively greater inflammability outside of said picture area.

7. A motion picture film the base of which has a central strip of cellulosic material of relatively low inflammability and has two marginal mechanical transmitting strips interunited to said central strip at the edges thereof, said marginal strips comprising cellulosic material of relatively greater inflammability.

8. A photographic film, the base of which comprises a portion which throughout its thickness is substantially composed of a derivative compound of cellulose and also comprises another portion which throughout its thickness is substantially composed of a different derivative compound of cellulose.

9. A motion picture film, the base of which has the portion within the picture area throughout its thickness substantially composed of a derivative compound of cellulose and also has mechanical transmitting portions outside of said picture area throughout their thickness composed of a different derivative compound of cellulose.

10. A motion picture film having a base which comprises cellulosic material less resistant to mechanical action than nitrocellulose, said base containing a tougher mechanical transmitting portion comprising nitrocellulose.

11. A motion picture film, the base of which comprises in the portion thereof that is subject to greater heat action a cellulosic material that is more resistant to such action than nitrocellulose, and comprises nitrocellulose in the portion thereof that is subject to lesser heat.

12. A motion picture film having a base of cellulose acetate, said base containing a mechanical transmitting portion which comprises nitrocellulose.

13. A motion picture film having a base, the portion of said base within the picture area being of cellulose acetate and the portion outside of the picture area including a mechanical transmitting element of nitrocellulose.

14. A motion picture film, the base of which has a central strip of cellulose acetate and has two marginal strips of nitrocellulose interunited to said central strip at the edges thereof.

15. A motion picture film, the base of which has a central strip of cellulose acetate substantially of the width of the picture area, and two marginal nitrocellulose strips for the perforations, said marginal strips being of substantially the same thickness as said central strip and being interunited to the edges thereof in substantially the same plane.

16. A motion picture film having a cellulosic base in a colloidal state, the portion thereof that is subject to greater heat action having relatively greater resistance to heat action, and the portion thereof that is subject to less heat action having relatively less resistance to heat action.

Signed at Rochester, New York, this 2nd day of May, 1922.

FRANK W. LOVEJOY.